US012457615B2

(12) United States Patent
Yang et al.

(10) Patent No.: US 12,457,615 B2
(45) Date of Patent: Oct. 28, 2025

(54) DOWNLINK CONTROL INFORMATION SCHEDULING

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 17/817,610

(22) Filed: Aug. 4, 2022

(65) Prior Publication Data

US 2023/0040587 A1    Feb. 9, 2023

Related U.S. Application Data

(60) Provisional application No. 63/260,052, filed on Aug. 6, 2021.

(51) Int. Cl.
*H04W 72/23* (2023.01)
*H04L 5/00* (2006.01)
*H04W 72/1268* (2023.01)
*H04W 72/566* (2023.01)

(52) U.S. Cl.
CPC ........... *H04W 72/23* (2023.01); *H04L 5/0078* (2013.01); *H04W 72/1268* (2013.01); *H04W 72/569* (2023.01)

(58) Field of Classification Search
CPC ............. H04W 72/23; H04W 72/1268; H04W 72/569; H04L 5/0078
See application file for complete search history.

(56) References Cited

U.S. PATENT DOCUMENTS

2021/0250134 A1\* 8/2021 Islam .................. H04B 7/0626

OTHER PUBLICATIONS

Apple Inc: "Remaining issues on intra-UE multiplexing/prioritization for eURLLC", 3GPP Draft; R1-2105084, 3rd Generation Partnership Project (3GPP), Mobile Cometence Centre; 650, Route Des Lucioles; F-06921 Sophia-Antipolis Cedex; France, vol. RAN WG1, No. e-Meeting; Apr. 10, 2021-May 27, 2021 May 12, 2021.\*

(Continued)

*Primary Examiner* — Brenda H Pham
(74) *Attorney, Agent, or Firm* — Harrity & Harrity, LLP

(57) ABSTRACT

Various aspects of the present disclosure generally relate to wireless communication. In some aspects, a network entity may schedule multiple downlink control information (DCI) messages, which schedule multiple uplink messages to be transmitted by a user equipment (UE) on physical uplink channel resources, such that each of the multiple DCI messages arrive at least a specified time duration earlier than a start of an earliest of the physical uplink channel resources. The network entity may transmit the multiple DCI messages as scheduled. The UE may prepare to receive the DCI messages as scheduled. Numerous other aspects are described.

30 Claims, 12 Drawing Sheets

(56) References Cited

OTHER PUBLICATIONS

Apple Inc: "Remaining Issues on Intra-UE Multiplexing/Prioritization for eURLLC", 3GPP TSG RAN WG1 #105-e, R1-2105084, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011173, pp. 1-4, figures 3,4, section 2.
International Search Report and Written Opinion—PCT/US2022/074638—ISA/EPO—Oct. 28, 2022.

* cited by examiner

DOWNLINK CONTROL INFORMATION SCHEDULING

CROSS-REFERENCE TO RELATED APPLICATION

This Patent Application claims priority to U.S. Provisional Patent Application No. 63/260,052, filed on Aug. 6, 2021, entitled "DOWNLINK CONTROL INFORMATION SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for scheduling downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network entity. The method may include scheduling multiple downlink control information (DCI) messages, which schedule multiple uplink messages (e.g., uplink control information (UCI) messages, uplink data messages) to be transmitted by a user equipment (UE) on physical uplink channel resources, such that each of the multiple DCI messages arrive at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The method may include transmitting the multiple DCI messages as scheduled.

Some aspects described herein relate to a method of wireless communication performed by a UE. The method may include preparing to receive multiple DCI messages, which schedule uplink messages to be transmitted on physical uplink channel resources, at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The method may include receiving the multiple DCI messages at least the specified time duration earlier than a start of the earliest of the physical uplink channel resources.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to schedule multiple DCI messages, which schedule multiple uplink messages to be transmitted by a UE on physical uplink channel resources, such that each of the multiple DCI messages arrive at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The instructions may be executable by the one or more processors to cause the network entity to transmit the multiple DCI messages as scheduled.

Some aspects described herein relate to a UE for wireless communication. The UE may include memory, one or more processors coupled to the memory, and instructions stored in the memory and executable by the one or more processors. The instructions may be executable by the one or more processors to cause the UE to prepare to receive multiple DCI messages, which schedule uplink messages to be transmitted on physical uplink channel resources, at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The instructions may be executable by the one or more processors to cause the UE to receive the multiple DCI messages at least the specified time duration earlier than a start of the earliest of the physical uplink channel resources.

Some aspects described herein relate to a non-transitory computer-readable medium that stores one or more instructions for wireless communication by a network entity. The one or more instructions, when executed by one or more processors of the network entity, may cause the network entity to schedule multiple DCI messages, which schedule multiple uplink messages to be transmitted by a UE on physical uplink channel resources, such that each of the multiple DCI messages arrive at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The one or more instructions, when executed by one or more processors of the network entity, may cause the network entity to transmit the multiple DCI messages as scheduled.

Some aspects described herein relate to a non-transitory computer-readable medium that stores one or more instructions for wireless communication by a UE. The one or more instructions, when executed by one or more processors of the UE, may cause the UE to prepare to receive multiple DCI messages, which schedule uplink messages to be transmitted on physical uplink channel resources, at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The one or more instructions, when executed by one or more processors of the UE, may cause the UE to receive the multiple DCI messages at least the specified time duration earlier than a start of the earliest of the physical uplink channel resources.

Some aspects described herein relate to an apparatus for wireless communication. The apparatus may include means for scheduling multiple DCI messages, which schedule multiple uplink messages to be transmitted by a UE on physical uplink channel resources, such that each of the multiple DCI messages arrive at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The apparatus may include means for transmitting the multiple DCI messages as scheduled.

Some aspects described herein relate to an apparatus for wireless communication. The apparatus may include means for preparing to receive multiple DCI messages, which schedule uplink messages to be transmitted on physical uplink channel resources, at least a specified time duration earlier than a start of an earliest of the physical uplink channel resources. The physical uplink channel resources may be on one or more of a high priority physical uplink control channel or a high priority physical uplink shared channel, and one or more of the physical uplink channel resources may overlap with a low priority physical uplink channel resource. The apparatus may include means for receiving the multiple DCI messages at least the specified time duration earlier than a start of the earliest of the physical uplink channel resources.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
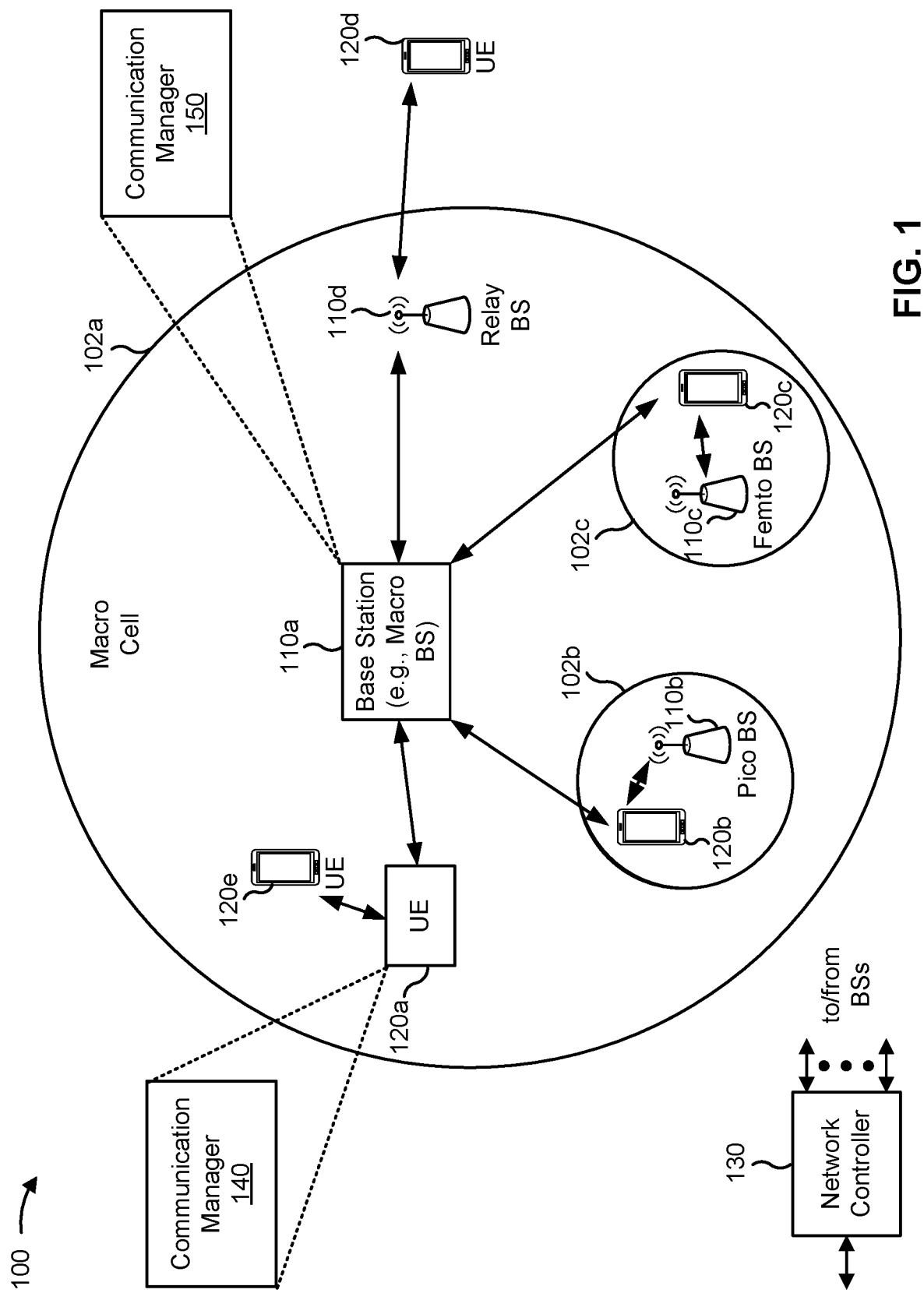
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network entity (e.g., base station 110) may include a communication manager 150. As described in more detail elsewhere herein, the communication manager 150 may schedule multiple downlink control information (DCI) messages, which schedule multiple uplink messages (e.g., uplink control information (UCI) messages, data messages on a physical uplink shared channel (PUSCH)) to be transmitted by a UE on physical uplink channel resources, such that each of the multiple DCI messages arrive at least a specified time duration earlier than a start of an earliest of the physical uplink channel resources. The communication manager 150 may transmit the multiple DCI messages as scheduled. Additionally, or alternatively, the communication manager 150 may perform one or more other operations described herein.

In some aspects, the UE 120 may include a communication manager 140. As described in more detail elsewhere herein, the communication manager 140 may prepare to receive multiple DCI messages, which schedule uplink messages to be transmitted on physical uplink channel resources, at least a specified time duration earlier than a start of an earliest of the physical uplink channel resources. The communication manager 140 may receive the multiple DCI messages at least the specified time duration earlier than a start of the earliest of the physical uplink channel resources. Additionally, or alternatively, the communication manager 140 may perform one or more other operations described herein.

As indicated above, FIG. 1 is provided as an example. Other examples may differ from what is described with regard to FIG. 1.

Figure 2:
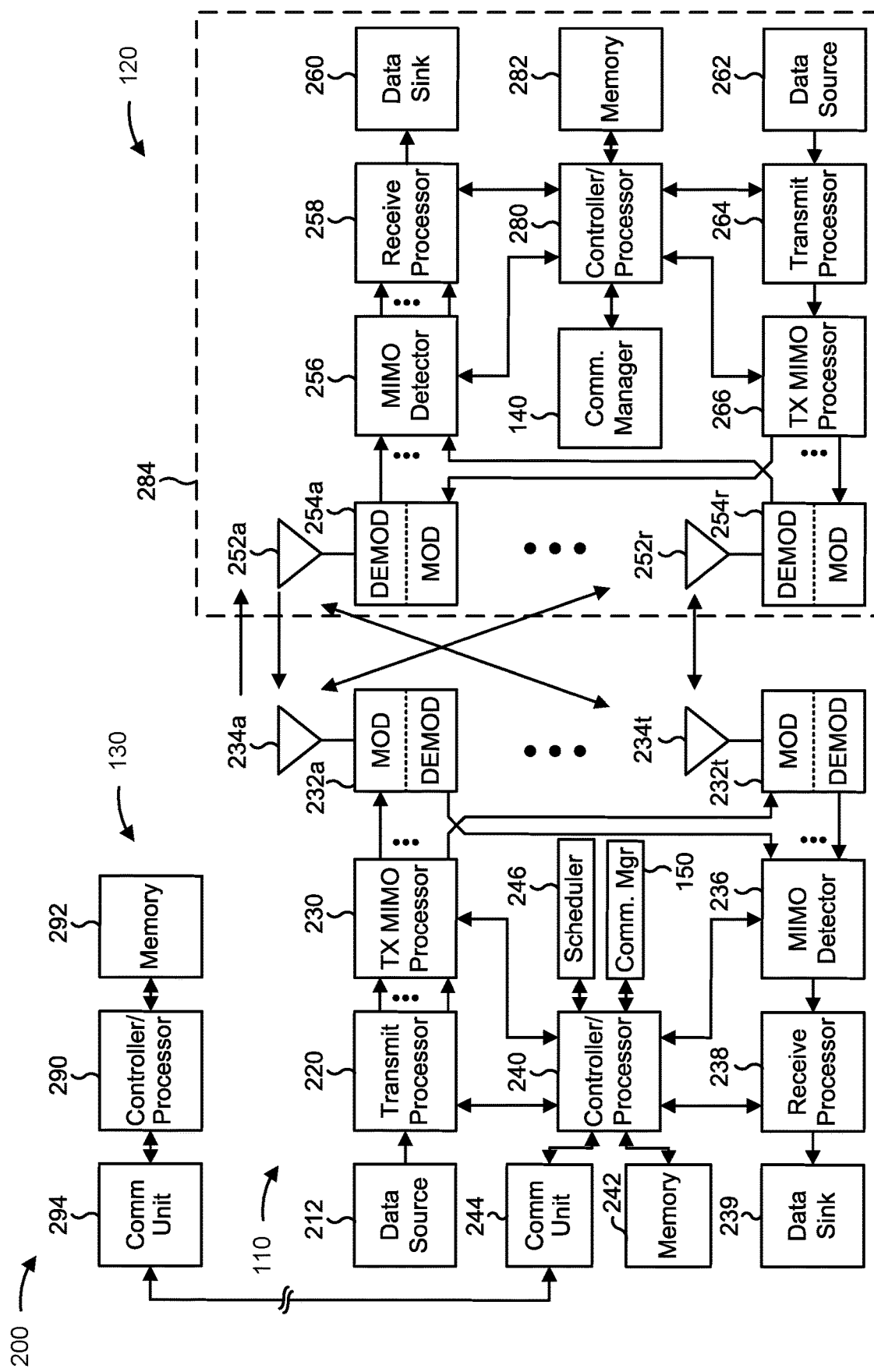
FIG. 2 is a diagram illustrating an example of a network entity in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor of the network entity (e.g., controller/processor 240 of the base station 110), the controller/processor 280 of the UE 120, and/or any other component(s) of FIG. 2 may perform one or more techniques associated with, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network entity (e.g., base station 110) includes means for scheduling multiple DCI messages, which schedule multiple uplink messages to be transmitted by a UE on physical uplink channel resources, such that each of the multiple DCI messages arrive at least a specified time duration earlier than a start of an earliest of the physical uplink channel resources; and/or means for transmitting the multiple DCI messages as scheduled. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for preparing to receive multiple DCI messages, which schedule uplink messages to be transmitted on physical uplink channel resources, at least a specified time duration earlier than a start of an earliest of the physical uplink channel resources; and/or means for receiving the multiple DCI messages at least the specified time duration earlier than a start of the earliest of the physical uplink channel resources. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
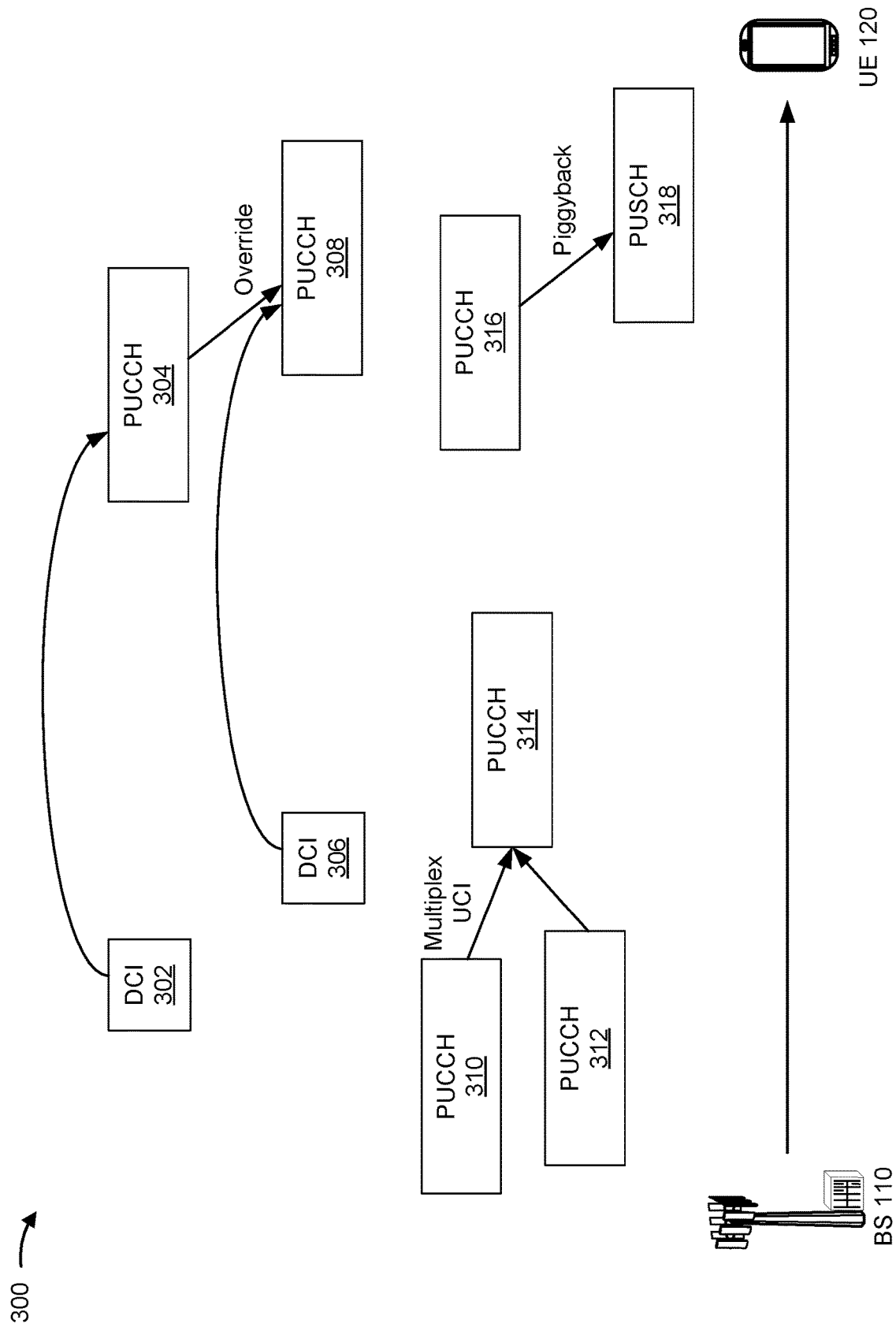
FIG. 3 is a diagram illustrating an example of downlink control information (DCI) that schedules physical uplink channel resources, in accordance with the present disclosure.

FIG. 3 is a diagram illustrating an example 300 of DCI that schedules physical uplink channel resources, in accordance with the present disclosure. As shown in FIG. 3, a network entity (e.g., base station 110) and a UE 120 may communicate with one another.

NR supports services with different reliability or latency requirements. For example, ultra-reliable low-latency communication (URLLC) applications, such as for emergency response, public safety, autonomous driving, or medical procedures, may have higher reliability requirements and stricter latency requirements than applications that may be served by enhanced mobile broadband (eMBB). Time-frequency resources (e.g., on a physical uplink control channel (PUCCH)) that are used for URLLC may be considered high priority (HP) resources, while resources that are not for URLLC may be considered low priority (LP) resources. More specifically, for example, two priority levels are defined in 3GPP standards Release 16, priority 0 and priority 1. Priority 1 indicates HP, and priority level 0 indicates LP. If resources of two different priorities are to collide, the resource with the LP will be canceled. This may be referred to as "intra-UE cancellation" or "intra-UE prioritization". The colliding of two resources may be equivalent to the collision of two transmissions (e.g., uplink control channel transmission/physical uplink control channel (PUCCH) transmission, or uplink data transmission/physical uplink shared channel (PUSCH) transmission) on the two respective resources.

In example 300, the base station 110 may transmit, to the UE 120, multiple DCI messages that each schedule physical uplink channel resources for uplink messages. The uplink messages may include PUSCH content or UCI, such as a hybrid automatic repeat request (HARQ) acknowledgement (ACK) or channel state information (CSI). The DCI are transmitted on a physical downlink control channel (PDCCH). The physical uplink channel resources may include resources on a PUCCH.

Example 300 shows a first DCI 302 that schedules (grants) a first PUCCH resource 304 for transmission of HARQ-ACK feedback. Example 300 also shows a second DCI 306 that schedules a second PUCCH resource 308. DCI 306 may include a PUCCH resource indicator that indicates that PUCCH resource 308 is to override PUCCH resource 304 and to carry the HARQ-ACK feedback. PUCCH resource 304 is effectively cancelled.

In some scenarios, a transmitting device, such as the UE 120, may multiplex multiple uplink messages of the same type and/or of different types in the same physical uplink channel resource, in order to better utilize such resources. This may be referred to as "intra-UE multiplexing". For example, the UE 120 may multiplex a HARQ-ACK with a scheduling request (SR), or multiplexing a HARQ-ACK with a CSI report, or multiplexing a first CSI report with a second CSI report. Content of a resource that is to be dropped may be multiplexed into another resource. For example, PUCCH resource 310 may collide with PUCCH resource 312. The UCI to be carried in PUCCH resource 310 and the UCI to be carried in PUCCH resource 312 may be multiplexed together into PUCCH resource 314. PUCCH resource 314 may be selected from PUCCH resource 310 and PUCCH resource 312, or PUCCH resource 314 may be a new PUCCH resource that is different than PUCCH resource 310 or PUCCH resource 312.

In some scenarios, a PUCCH resource 316 may carry HARQ-ACK feedback or CSI. However, the PUCCH resource 316 may collide with a PUSCH resource 318 that is to carry data. The HARQ-ACK feedback or CSI of the PUCCH resource 316 may be multiplexed with the data in the PUSCH resource 318. Multiplexing UCI of a PUCCH resource into a PUSCH resource may be referred to as "piggybacking". The PUCCH resource 316 may then be canceled.

As indicated above, FIG. 3 is provided as an example. Other examples may differ from what is described with regard to FIG. 3.

Figure 4:
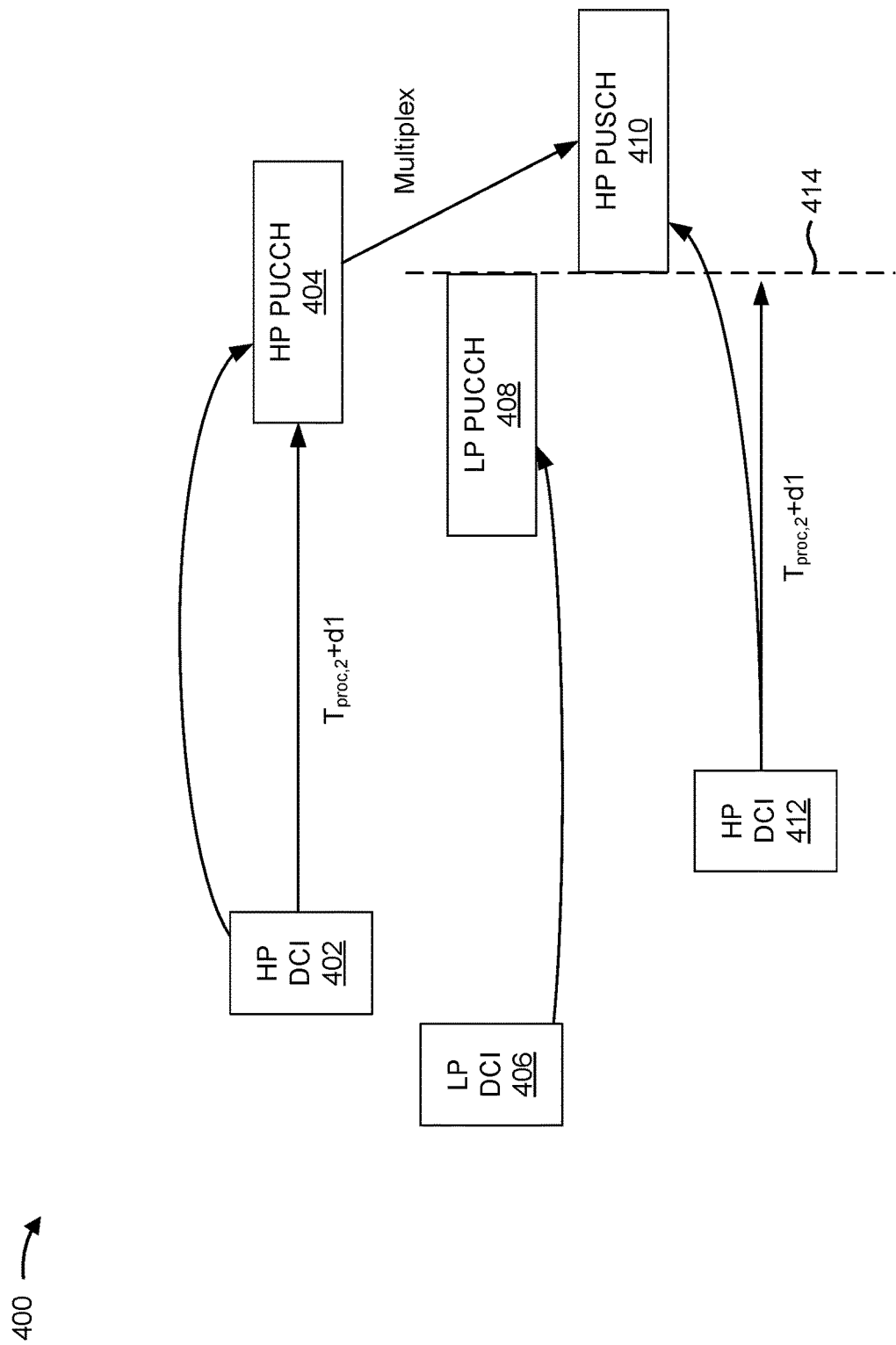
FIG. 4 is a diagram illustrating an example of overlapping resources, in accordance with the present disclosure.

FIG. 4 is a diagram illustrating an example 400 of overlapping resources, in accordance with the present disclosure.

One issue with intra-UE cancellation in Release 16 (e.g., technical specification (TS) 38.213 Clauses 9.2.5 and 9.2.6) is that the UE 120 is to cancel a LP resource if the UE 120 receives a HP DCI (grant) that schedules a HP resource that overlaps with the LP resource. Moreover, the UE 120 is to perform intermediate cancellations (cancellations of scheduled resources or cancellations of intermediate resources of multiplexed content) even though the final HP resource (after resolving the collisions among scheduled HP resources) may not overlap with the LP resource. More specifically, "intermediate cancellation" may refer to the situation in which the intermediate HP channels (which may not be final) can all be used to cancel (the transmission) of an overlapping LP channel. This adds considerable complexity that consumes processing resources of the UE 120.

Example 400 illustrates some of this additional complexity. The UE 120 may transmit HP DCI 402 that schedules HP PUCCH resource 404. According to Release 16, a scheduled resource on the PUCCH is start at least a specified time duration after the scheduling DCI received on the PDCCH. The specified time duration allows for processing by the UE 120. This specified time duration may include a time duration referred to as "$T_{proc,2}+dl$".

In example 400, the UE 120 received an LP DCI 406 that schedules an LP PUCCH resource 408, and HP PUCCH resource 404 collides (overlaps) with LP PUCCH resource 408. According to Release 16, the UE 120 is to cancel LP PUCCH resource 408, regardless of whether HP PUCCH 404 is used for transmission following any other intermediate cancellation or multiplexing. The content of LP PUCCH resource 408 will have to be transmitted at a later time. Note that if the content of HP PUCCH 404 is multiplexed in HP PUSCH resource 410 (scheduled by HP DCI 412), LP PUCCH resource 408 would not have to be canceled, as shown by line 414.

However, to comply with the current design specified by Release 16, the UE 120 has to check for overlap between LP PUCCH resource 408 and every intermediate resource (resulting from multiplexing among HP resources), and any overlapping intermediate HP resource will cancel LP PUCCH resource 408. This adds complexity and the complexity increases further as the quantity of intermediate resources increases.

As indicated above, FIG. 4 is provided as an example. Other examples may differ from what is described with respect to FIG. 4.

Figure 5:
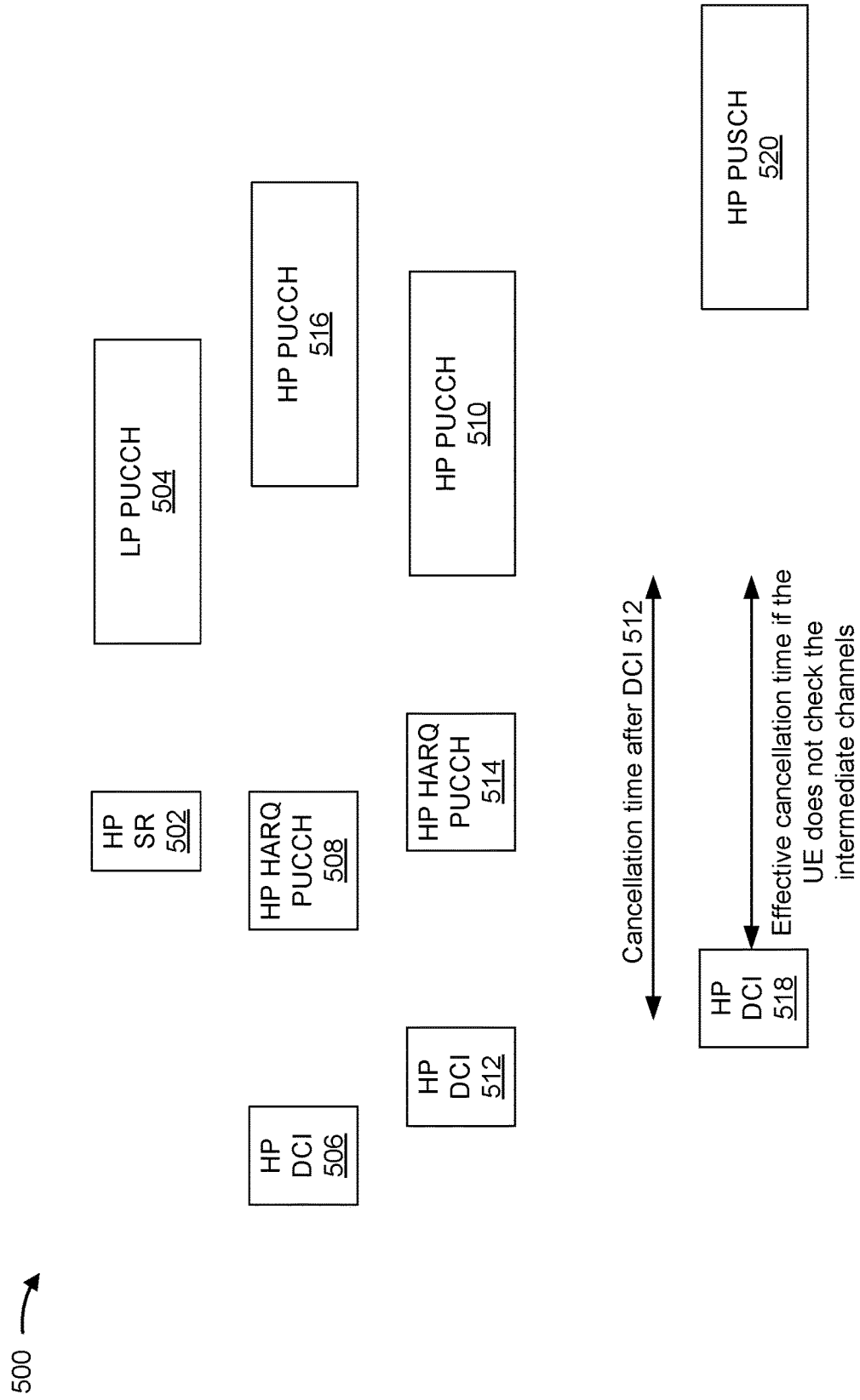
FIG. 5 is a diagram illustrating an example of overlapping resources, in accordance with the present disclosure.

FIG. 5 is a diagram illustrating an example 500 of overlapping resources, in accordance with the present disclosure.

Example 500 further illustrates the issue for the UE 120. The UE 120 is to transmit an HP SR 502 and other content in LP PUCCH 504. The UE 120 receives HP DCI 506 that schedules HARQ-ACK to be transmitted in HP PUCCH resource 508. The UE 120 may multiplex the HARQ-ACK from HP PUCCH resource 508 with HP SR 502 into intermediate HP PUCCH resource 510.

Next, the UE 120 receives HP DCI 512 that schedules HP PUCCH resource 514 for HARQ-ACK, which is to override HP PUCCH resource 508 for the transmission of the HARQ-ACK. Because HP PUCCH resource 514 again overlaps with HP SR 502, the UE 120 multiplexes the HARQ-ACK from HP PUCCH 514 with HP SR 502 into intermediate HP PUCCH resource 516. Note that HP PUCCH resource 516 starts later in time than HP PUCCH resource 510.

Ultimately, the UE 120 receives HP DCI 518 and then piggybacks the multiplexed content of HP PUCCH resource 516 into HP PUSCH resource 520, which does not collide with LP PUCCH resource 504. However, according to Release 16, the UE 120 is to cancel LP PUCCH resource 504, which was, in the end, not necessary. Furthermore, the UE 120 had to keep track of each scheduled resource and each intermediate resource (multiplexed content) and check each scheduled or intermediate resource for overlap with LP PUCCH resource 504. In other words, the UE 120 had to perform multiple intermediate checks against LP PUCCH resource 504 that consumed processing resources only to cancel LP PUCCH resource 504. The receipt of HP DCI 518 further reduced the amount of time that UE 120 had for any necessary cancelation of LP PUCCH resources. Furthermore, receiving DCI for later transmission of the canceled content of LP PUCCH resource 504 and attempting to transmit that content consumes additional processing resources.

As indicated above, FIG. 5 is provided as an example. Other examples may differ from what is described with regard to FIG. 5.

Figure 6:
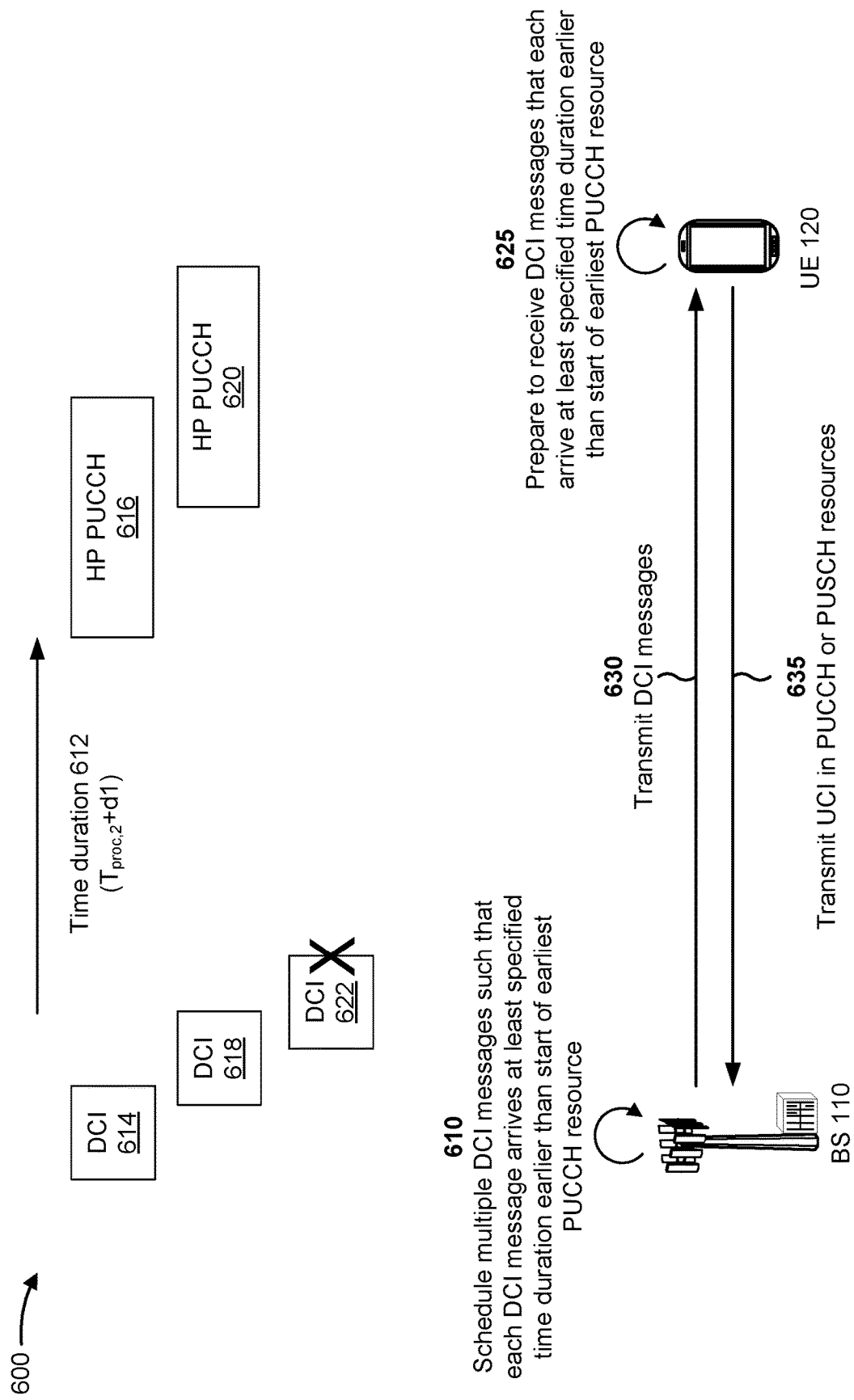
FIG. 6 is a diagram illustrating an example of scheduling multiple DCI messages, in accordance with the present disclosure.

FIG. 6 is a diagram illustrating an example 600 of scheduling multiple DCI messages, in accordance with the present disclosure. As shown in FIG. 6, a base station 110 and a UE 120 may communicate with one another.

According to various aspects described herein, a network entity (e.g., base station 110) may schedule DCI messages with a new timeline to relax the processing burden on the UE 120. In some aspects, the base station 110 may schedule DCI messages (e.g., HP DCI) such that each HP DCI arrives at least a specified time duration before HP resources (e.g., HP PUCCH resources, HP PUSCH resources) that are scheduled by HP DCIs. That is, the UE 120 may enforce a minimum time between DCI messages and the HP resources scheduled by other DCI messages. The affected HP resources may include all of the HP resources that are scheduled by the HP DCIs, at least within a time period, for a group of DCI messages, for a HARQ process or a set of HARQ process, and/or for an uplink message or a set of uplink messages.

The specified time duration may be based at least in part on a processing time for the UE 120. The specified time duration may be Tproc, 2+dl or a similar processing time referred to in a standards release. The UE 120 may obtain the specified time duration from stored configuration information (standards information) or by indication from the base station 110.

Example 600 shows one example of using a specified time duration 612 among multiple DCI messages and multiple HP resources. As shown by reference number 610, the base station 110 may schedule multiple DCI messages (e.g., HP DCI messages) such that each DCI message arrives at least the specified time duration 612 earlier that a start of an earliest physical uplink channel resource (e.g., HP PUCCH resource, HP PUSCH resource, HP SR). The earliest physical uplink channel resource may apply only to HP resources scheduled with HP DCI. The specified time duration 612 shown in example 600 is Tproc, 2+dl.

For example, the base station 110 may schedule DCI 614, which schedules PUCCH resource 616. The base station 110 may also schedule later DCI 618, which schedules PUCCH resource 620. Each of DCI 614 and DCI 618 are to be received by the UE 120 at least the specified time duration 612 before both HP PUCCH resource 616 and HP PUCCH resource 620. Note that DCI 618 is still at least the specified time duration 612 before HP PUCCH resource 616. Accordingly, the base station 110 may not schedule DCI 622 at the time position shown in example 600, because DCI 622 is not at least the specified time duration 612 before the earliest of HP PUCCH resource 616 and HP PUCCH resource 620.

As shown by reference number 625, the UE 120 may prepare to receive DCI messages, such as DCI 614 and DCI 618, that each arrive at least the specified time duration 612 before an earliest scheduled (HP) PUCCH resource. The UE 120 may not expect any DCI messages within the specified time duration 612 before the earliest scheduled PUCCH resource (or earlier PUSCH resource). That is, the UE 120 may prepare to receive DCI messages outside the specified time duration 612 and prepare to not receive DCI messages within the specified time duration by not expending processing resources in expectation of receiving DCI messages within the specified time duration. In some aspects, the UE 120 may track a point in time that is the specified time duration 612 before the start of the earliest scheduled physical uplink channel resource and ignore DCI messages that occur after the point in time. The point in time may be updated only if a DCI message before the point in time schedules a physical uplink channel resource that is earlier than the current earliest physical uplink channel resource. Note that the use of the earliest physical uplink channel resource in example 600 may not account for intermediate physical uplink channel resources created by intra-UE multiplexing, piggybacking, or PUCCH overriding.

As shown by reference number 630, the base station 110 may transmit the DCI messages as scheduled. As shown by reference number 635, the UE 120 may use a physical uplink channel resource (e.g., HP PUCCH resource 620) scheduled by the DCI messages to transmit UCI, such as HARQ-ACK feedback or an SR. By setting a timeline for receiving DCI messages and reducing the amount of checking done by UE 120, the base station 110 may remove some of the processing burden of the UE 120, causing the UE 120 to conserve processing resources.

As indicated above, FIG. 6 is provided as an example. Other examples may differ from what is described with regard to FIG. 6.

Figure 7:
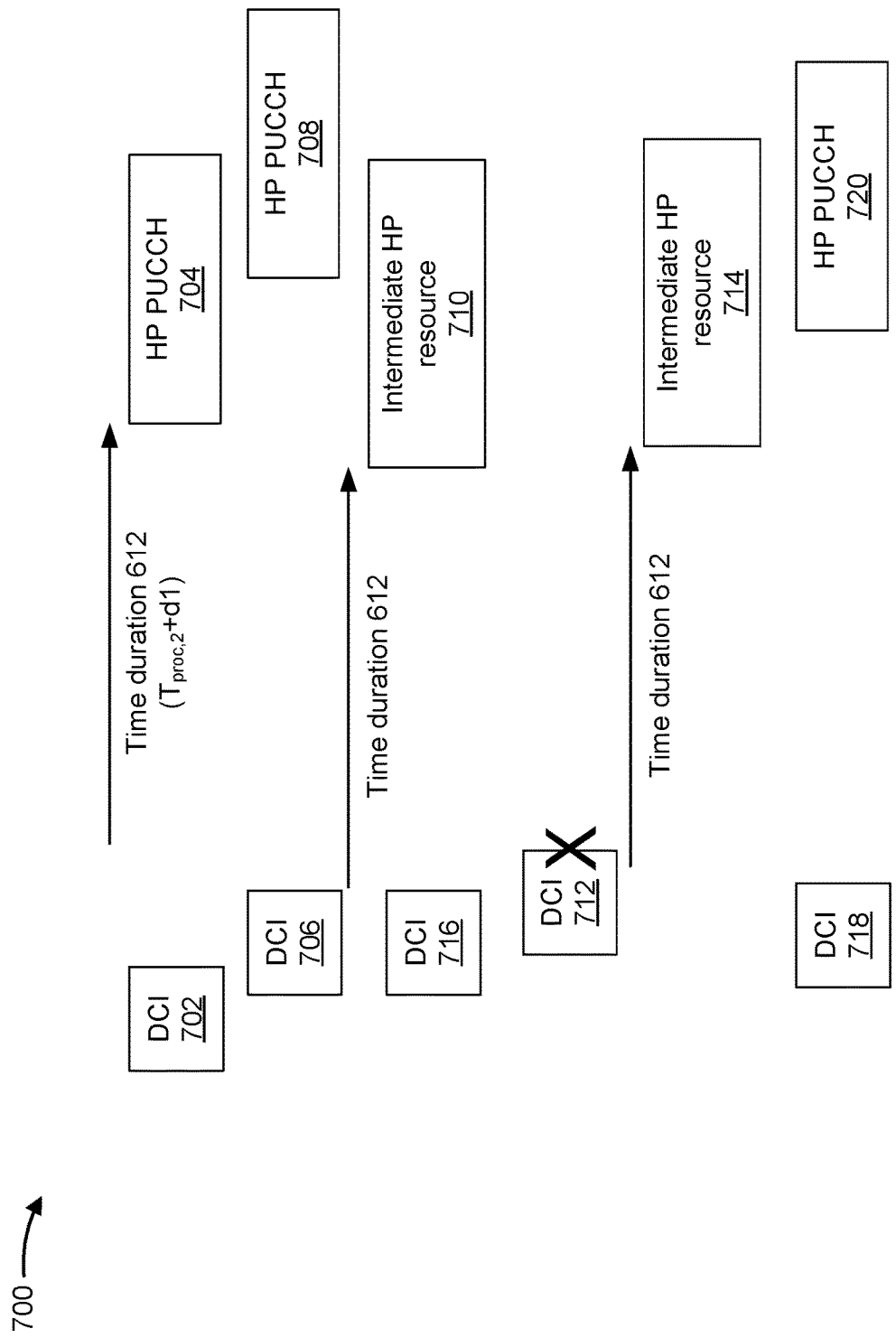
FIG. 7 is a diagram illustrating another example of scheduling DCI messages, in accordance with the present disclosure.

FIG. 7 is a diagram illustrating another example 700 of scheduling DCI messages, in accordance with the present disclosure.

In some aspects, the specified time duration 612 may also apply to intermediate resources that are created for multiplexed UCI. The base station 110 is aware of the multiplexing and cancellation rules used by the UE 120 and is able to determine not only an earliest scheduled physical uplink channel resource (scheduled by DCI) but an earliest intermediate resource. Accordingly, the base station 110 may schedule DCI messages such that each of the multiple DCI messages arrive at least the specified time duration 612 earlier than a start of an earliest of one or more intermediate physical uplink channel resources used by the UE for multiplexed UCI.

Example shows this aspect. The base station 110 may schedule DCI 702, which schedules HP PUCCH resource 704. The base station 110 may schedule DCI 706 for HP PUCCH resource 708, because DCI 706 is still outside the specified time duration 612 before an earliest physical uplink channel resource (HP PUCCH resource 704). However, the UE 120 may multiplex the UCI of HP PUCCH resource 704 and the UCI of HP PUCCH resource 708 into intermediate HP physical uplink channel resource 710, because intermediate HP resource 710 is large enough for both UCI, or for other reasons. Intermediate HP resource 710 starts earlier than HP PUCCH resource 704 and thus the specified time duration 612 now applies to intermediate HP resource 710. This moves the point in time for not scheduling DCI message earlier. Accordingly, the base station 110 may not schedule DCI 712 at the planned time position shown in example 700. Even though DCI 712 was to be scheduled at least the specified time duration 612 before HP PUCCH resource 704, DCI 712 is not outside the specified time duration 612 before intermediate HP resource 710, which is earlier than HP PUCCH resource 704. To relieve the processing burden on the UE 120, the base station 110 will save the scheduling of DCI 712 for another time instance after the currently scheduled set of physical uplink channel resources are used by the UE 120. The UE 120 may prepare for the receipt of DCI messages by using processing resources for tasks other than processing (and checking overlap for) DCI messages after the point in time that is the specified time duration 612 before intermediate HP resource 710.

In some aspects, the base station 110 may schedule (and the UE 120 may prepare for) DCI messages based at least in part on the specified time duration 612 before an earliest physical uplink channel resource, which may include resources scheduled before and after any intra-UE multiplexing among HP channels and any PUCCH overriding. This may mean that the base station 110 schedules two (or more) HP physical uplink channel resources (for two or more HP channels), one earlier than intra-UE multiplexing among HP channels and one later than intra-UE multiplexing among HP channels. The base station 110 may schedule DCI messages at least the specified time duration 612 before both HP channels.

In some aspects, the base station 110 may schedule multiple DCI messages such that each of the multiple DCI messages arrive at least the specified time duration 612 earlier than a start of a last or most recent physical uplink channel resource used by the UE for multiplexed uplink messages. For example, if the UE 120 is to create intermediate HP resource 714 (as a last or most recent intermediate resource), the base station 110 may reference intermediate HP resource 714 as the earliest physical uplink channel resource to which the specified time duration 612 applies. "Recent" or "last" may refer to when the intermediate HP resource was created.

In some aspects, the base station 110 may schedule multiple DCI messages such that each of the multiple DCI messages arrive at least the specified time duration 612 earlier than a start of a last or most recent physical uplink channel resource used by the UE 120 for multiplexed uplink messages, if the UE 120 ignores high priority DCI messages that are received after a DCI message that schedules the last or most recent physical uplink channel resource. In example 700, this DCI message would be DCI 706 and the last or most recent physical uplink channel resource used for multiplexed DCI would be intermediate HP resource 710 if this resource was originally a scheduled HP PUCCH resource scheduled by DCI 716. In referring to "last", this may be a hypothetical last, because intermediate HP resource 710 may or may not be an actual last intermediate HP resource (see intermediate HP resource 714). Rather, if no other DCI messages are received, then intermediate HP resource 710 is the "last" intermediate HP resource. Note that if the UE 120 misses a last DCI message that schedules the last intermediate HP resource, the UE 120 may not have sufficient time to cancel the LP physical uplink channel resource.

If referring to example 500, if the UE 120 does not receive HP DCI 512 and HP DCI 518, HP PUCCH 510 may be the last or most recent intermediate HP PUCCH resource. If the UE 120 receives HP DCI 512 but not HP DCI 518, HP PUCCH resource 516 may be the last or most recent intermediate HP PUCCH resource (note that HP PUCCH resource 516 was created after HP PUCCH resource 510 despite the positioning in example 500. As a result, if the UE 120 misses the later HP DCI 518, the UE 120 may still have enough time to cancel the LP channel according to the detected HP DCI 512.

The UE 120 may move UCI from one HP PUCCH resource to another PUCCH resource or another PUSCH resource due to PUCCH overriding for a HARQ-ACK report, different UCIs multiplexing on a different HP PUCCH resources (e.g., due to payload size change), or UCI piggybacking on the PUSCH. In some aspects, when there is intra-UE multiplexing or intra-UE cancellation across different priorities (HP and LP), the UE 120 may not expect that a second DCI message moves UCI scheduled by a first DCI message (or configured via radio resource control (RRC) signaling) to an HP PUCCH resource or HP PUSCH resource that starts earlier. The second DCI message is received later in time than the first DCI message. More precisely, the ending symbol of the second DCI message is later in time than the ending symbol of the first DCI message. For example, referring to example 700, the base station 110 may not schedule DCI 718 because HP PUCCH resource 720 starts earlier than HP PUCCH resource 708 scheduled by the earlier DCI 706. In another example, the UE 120 may move UCI from HP PUCCH resource 704 to HP PUCCH resource 708, but not from HP PUCCH resource 704 to intermediate HP resource 710.

In some aspects, the UE 120 may not cancel an LP physical uplink channel resource if the LP physical uplink channel resource does not overlap with a most recent or last intermediate HP resource. The timeline for some aspects may account for the ability to still transmit on an LP physical uplink channel resource and on an HP physical uplink channel resource that at one time may have overlapped or collided with the LP physical uplink channel resource.

In some aspects, the UE 120 may only use the most recent or final DCI-scheduled HP PUCCH resource for intra-UE cancellation. That is, intermediate HP resources may not cancel an LP resource, regardless of whether the intermediate HP resource overlaps with the LP resource. The UE 120 may prepare to transmit uplink messages on the LP resource when it is determined that the LP resource is to not be canceled (e.g., if the LP resource does not collide with the most recent or last HP resource). This may apply in combination with one or more conditions or rules discussed earlier with respect to examples 600 and 700.

As indicated above, FIG. 7 is provided as an example. Other examples may differ from what is described with regard to FIG. 7.

Figure 8:
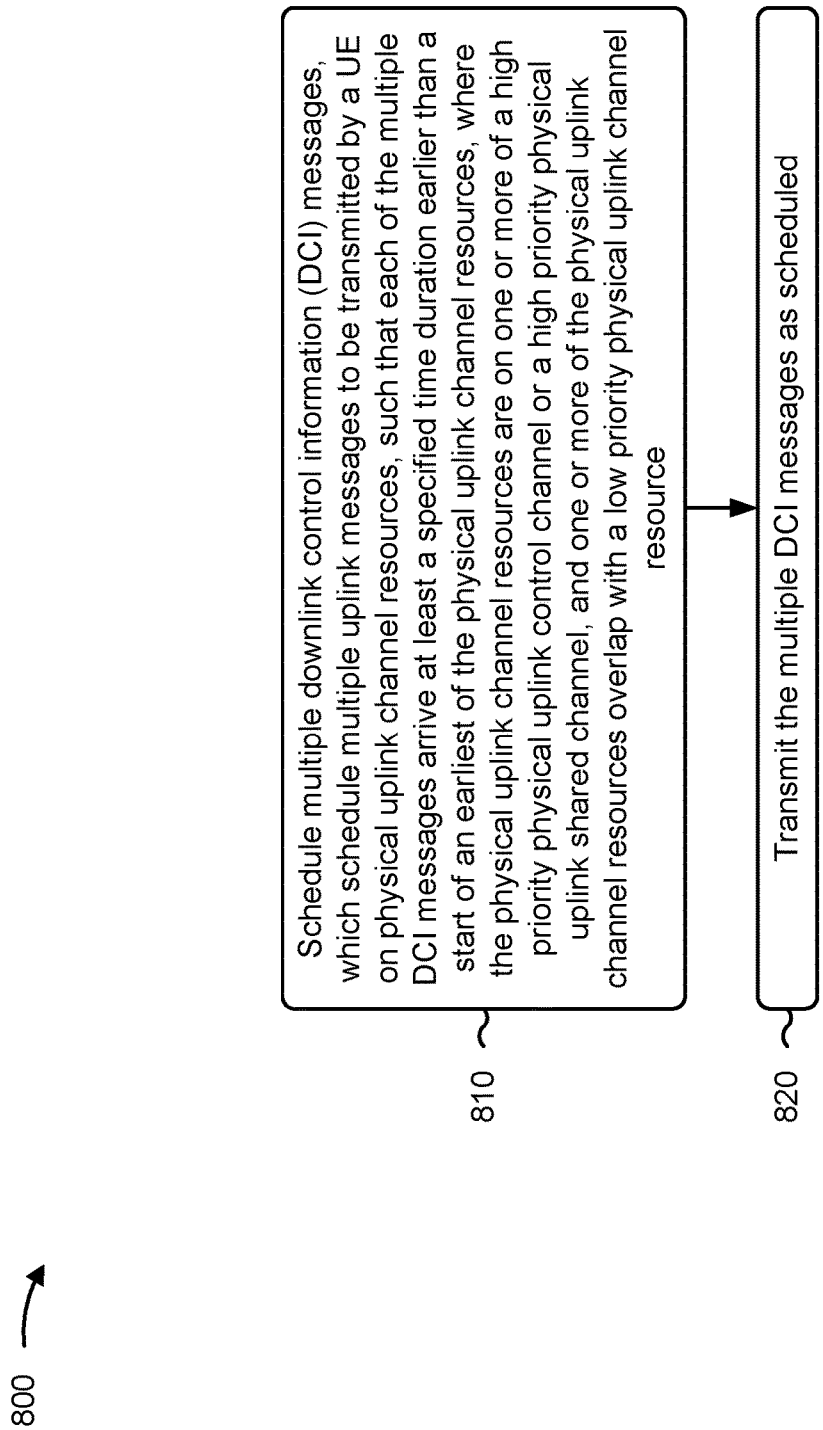
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110) performs operations associated with scheduling DCI messages.

As shown in FIG. 8, in some aspects, process 800 may include scheduling multiple DCI messages, which schedule multiple uplink messages to be transmitted by a UE on physical uplink channel resources, such that each of the multiple DCI messages arrive at least a specified time duration earlier than a start of an earliest of the physical uplink channel resources (block 810). For example, the network entity (e.g., using communication manager 150 and/or scheduling component 1008 depicted in FIG. 10) may schedule multiple DCI messages, which schedule multiple uplink messages to be transmitted by a UE on physical uplink channel resources, such that each of the multiple DCI messages arrive at least a specified time duration earlier than a start of an earliest of the physical uplink channel resources, as described above. The uplink messages may include UCI message or PUSCH content. The physical uplink channel resources may be on a high priority PUCCH and/or a high priority PUSCH, and one or more of the physical uplink channel resources may overlap with a low priority physical uplink channel resource. The specified time duration may be specified as $T_{proc,2}+dl$, where $T_{proc,2}$ is an uplink channel preparation time, and where dl is an additional cancelation time.

As further shown in FIG. 8, in some aspects, process 800 may include transmitting the multiple DCI messages as scheduled (block 820). For example, the network entity (e.g., using communication manager 150 and/or transmission component 1004 depicted in FIG. 10) may transmit the multiple DCI messages as scheduled, as described above.

Process 800 may include additional aspects, such as any single aspect or any combination of aspects described below and/or in connection with one or more other processes described elsewhere herein.

In a first aspect, the physical uplink channel resources are on one or more of an HP PUCCH or an HP PUSCH.

In a second aspect, alone or in combination with the first aspect, the scheduling the multiple DCI messages includes further scheduling the multiple DCI messages such that each of the multiple DCI messages arrive at least the specified time duration earlier than a start of an earliest of one or more intermediate physical uplink channel resources used by the UE for multiplexed uplink messages.

In a third aspect, alone or in combination with one or more of the first and second aspects, a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

In a fourth aspect, alone or in combination with one or more of the first through third aspects, the scheduling the multiple DCI messages includes further scheduling the multiple DCI messages such that each of the multiple DCI messages arrive at least the specified time duration earlier than a start of a last physical uplink channel resource used by the UE for multiplexed uplink messages.

In a fifth aspect, alone or in combination with one or more of the first through fourth aspects, the scheduling the multiple DCI messages includes further scheduling the multiple DCI messages such that each of the multiple DCI messages arrive at least the specified time duration earlier than a start of a most recent physical uplink channel resource used by the UE for multiplexed uplink messages, if the UE ignores high priority DCI messages that are received after a DCI message that schedules the last physical uplink channel resource.

In a sixth aspect, alone or in combination with one or more of the first through fifth aspects, scheduling the multiple DCI messages includes scheduling the multiple DCI messages such that a first DCI message schedules a first physical uplink channel resource, a second DCI message schedule a second physical uplink channel resource, and the second physical uplink channel resource does not start earlier than the first physical uplink channel resource if an uplink message of the first physical uplink channel resource is moved to the second physical uplink channel resource.

In a seventh aspect, alone or in combination with one or more of the first through sixth aspects, the first physical uplink channel resource and the second physical uplink channel resource are on one or more high priority channels, and process 800 includes preparing to receive an uplink message that is not to be canceled on an LP channel.

In an eight aspect, alone or in combination with one or more of the first through seventh aspects, process 800 includes checking for overlap between a low priority channel and a final high priority channel, where the final high priority channel is a result of multiplexing content of multiple uplink channels, and receiving on the low priority channel if one of the multiple uplink channels overlaps with the low priority channel and the low priority channel does not overlap with the final high priority channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
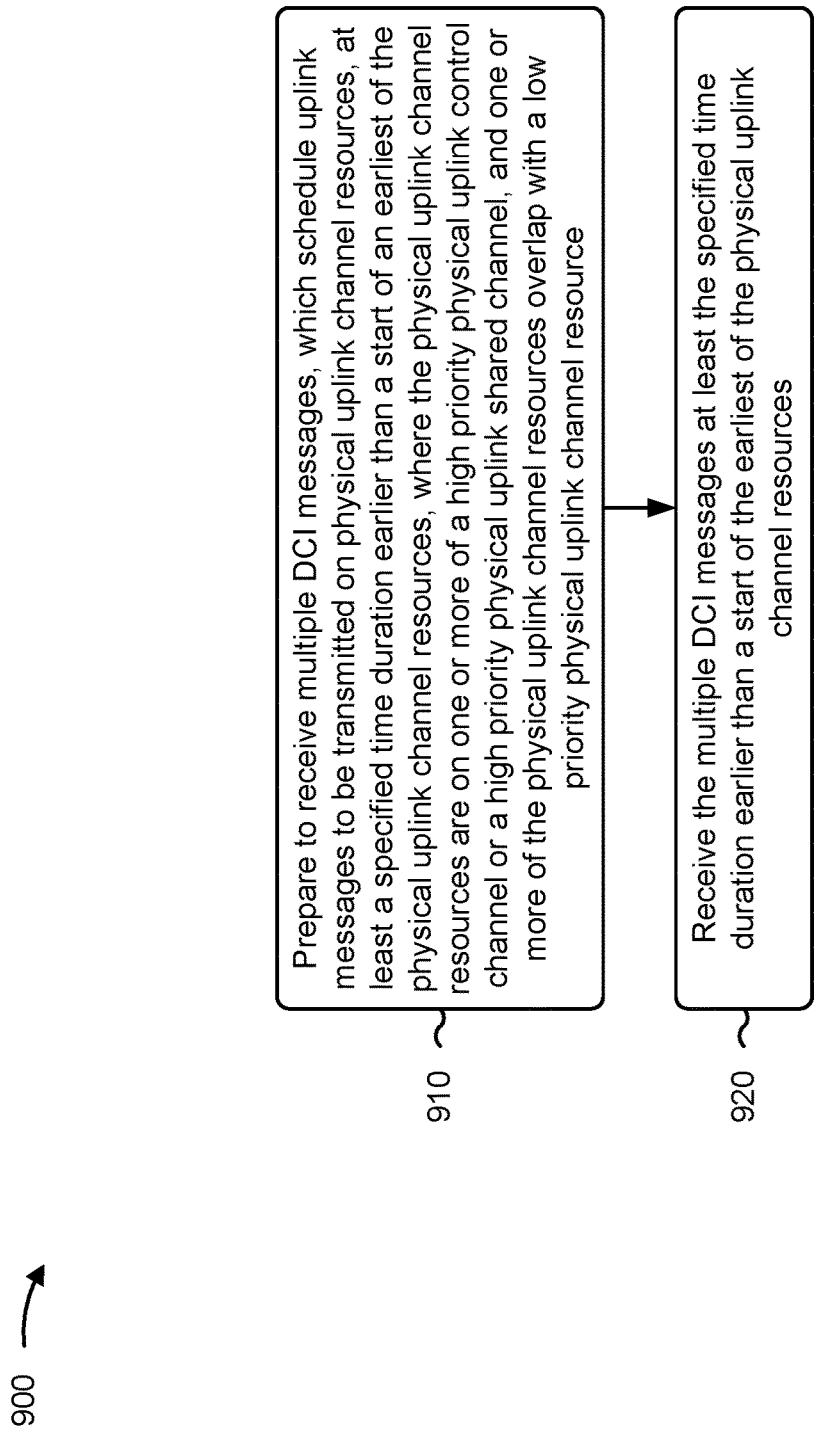
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with receiving multiple DCI messages.

As shown in FIG. 9, in some aspects, process 900 may include preparing to receive multiple DCI messages, which schedule uplink messages to be transmitted on physical uplink channel resources, at least a specified time duration earlier than a start of an earliest of the physical uplink channel resources (block 910). For example, the UE (e.g., using communication manager 140 and/or preparation component 1108 depicted in FIG. 11) may prepare to receive multiple DCI messages, which schedule uplink messages to be transmitted on physical uplink channel resources, at least a specified time duration earlier than a start of an earliest of the physical uplink channel resources, as described above. The physical uplink channel resources may be on a high priority PUCCH and/or a high priority PUSCH, and one or more of the physical uplink channel resources may overlap with a low priority physical uplink channel resource. The specified time duration may be specified as $T_{proc,2}+dl$.

As further shown in FIG. 9, in some aspects, process 900 may include receiving the multiple DCI messages at least the specified time duration earlier than a start of the earliest of the physical uplink channel resources (block 920). For example, the UE (e.g., using communication manager 140 and/or reception component 1102 depicted in FIG. 11) may receive the multiple DCI messages at least the specified time duration earlier than a start of the earliest of the physical uplink channel resources, as described above.

Process 900 may include additional aspects, such as any single aspect or any combination of aspects described below and/or in connection with one or more other processes described elsewhere herein.

In a first aspect, the physical uplink channel resources are on one or more of an HP PUCCH or an HP PUSCH.

In a second aspect, alone or in combination with the first aspect, process 900 includes multiplexing at least one of the uplink messages scheduled by the multiple DCI messages into one or more intermediate physical uplink channel resources, and preparing to receive the multiple DCI messages includes preparing to receive the multiple DCI messages at least the specified time duration earlier than the start of an earliest of the one or more intermediate physical uplink channel resources.

In a third aspect, alone or in combination with one or more of the first and second aspects, a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

In a fourth aspect, alone or in combination with one or more of the first through third aspects, the preparing to receive the multiple DCI messages includes preparing to receive the multiple DCI messages at least the specified time duration earlier than the start of a most recent physical uplink channel resource used by the UE for multiplexed uplink messages.

In a fifth aspect, alone or in combination with one or more of the first through fourth aspects, process 900 includes ignoring high priority DCI messages that are received after a DCI message that schedules the last physical uplink channel resource used by the UE for multiplexed uplink messages.

In a sixth aspect, alone or in combination with one or more of the first through fifth aspects, receiving the multiple DCI messages includes receiving a first DCI message that schedules a first physical uplink channel resource and a second DCI message that schedules a second physical uplink channel resource, and the second physical uplink channel resource does not start earlier than the first physical uplink channel resource if an uplink message of the first physical uplink channel resource is moved to the second physical uplink channel resource.

In a seventh aspect, alone or in combination with one or more of the first through sixth aspects, the first physical uplink channel resource and the second physical uplink channel resource are on one or more high priority channels, and process 900 includes transmitting an uplink message that is not to be canceled on an LP channel.

In an eighth aspect, alone or in combination with one or more of the first through seventh aspects, process 900 includes checking for overlap between a low priority channel and a final high priority channel, where the final high priority channel is a result of multiplexing content of multiple uplink channels, and canceling the low priority channel if the low priority channel and the final high priority channel overlap.

In a ninth aspect, alone or in combination with one or more of the first through eighth aspects, process 900 includes checking for overlap between a low priority channel and a final high priority channel, where the final high priority channel is a result of multiplexing content of multiple uplink channels, and transmitting the low priority channel if one of the multiple uplink channels overlaps with the low priority channel and the low priority channel does not overlap with the final high priority channel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
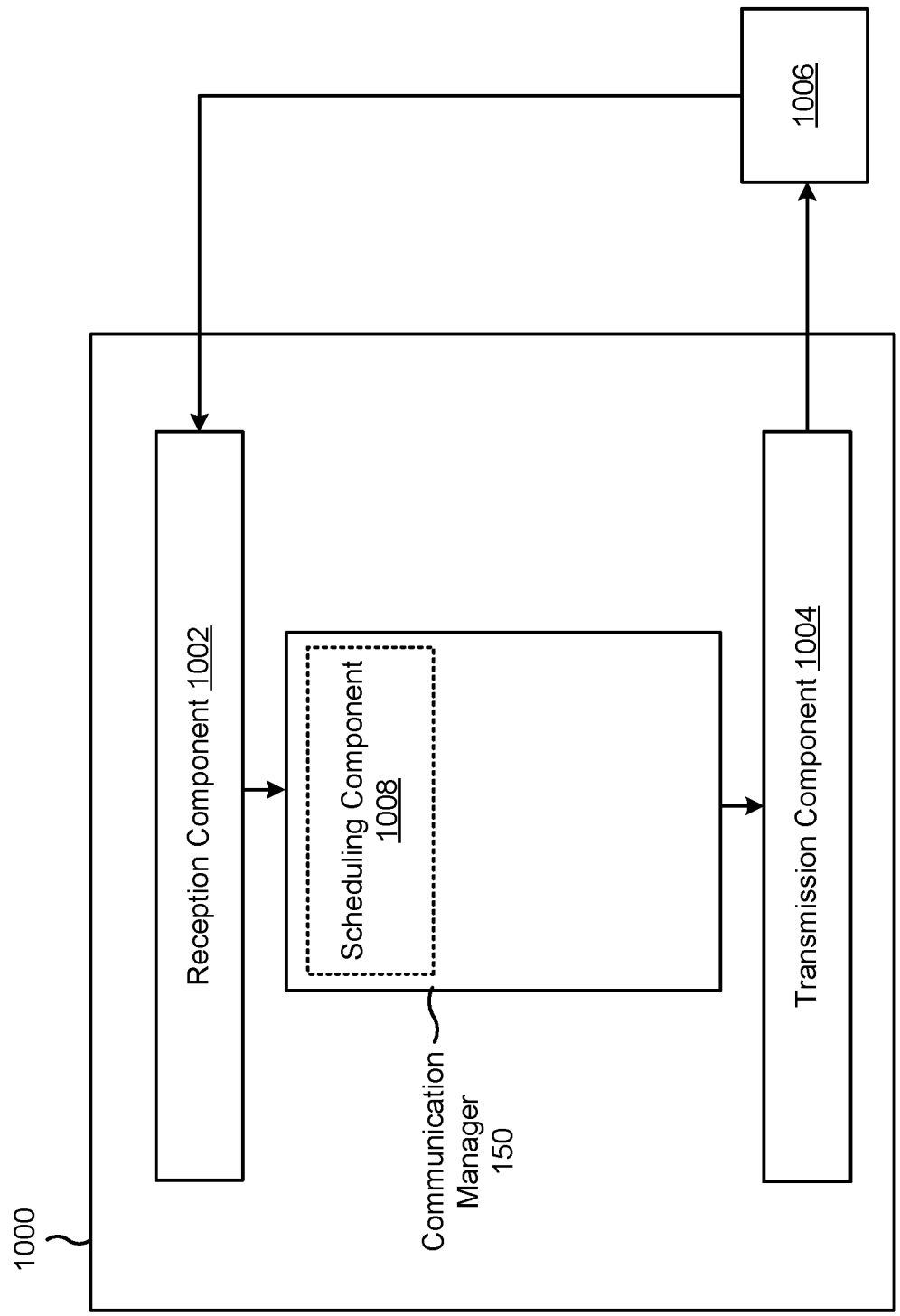
FIGS. 10-11 are diagrams of example apparatuses for wireless communication, in accordance with the present disclosure.

FIG. 10 is a diagram of an example apparatus 1000 for wireless communication. The apparatus 1000 may be a network entity (e.g., base station 110), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a network entity, or another wireless communication device) using the reception component 1002 and the transmission component 1004. As further shown, the apparatus 1000 may include the communication manager 150. The communication manager 150 may include a scheduling component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The scheduling component 1008 may schedule multiple DCI messages, which schedule multiple uplink messages to be transmitted by a UE on physical uplink channel resources, such that each of the multiple DCI messages arrive at least a specified time duration earlier than a start of an earliest of the physical uplink channel resources. The physical uplink channel resources may be on one or more of an HP PUCCH or an HP PUSCH. The physical uplink channel resources may overlap with an LP physical uplink channel resource. The transmission component 1004 may transmit the multiple DCI messages as scheduled.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
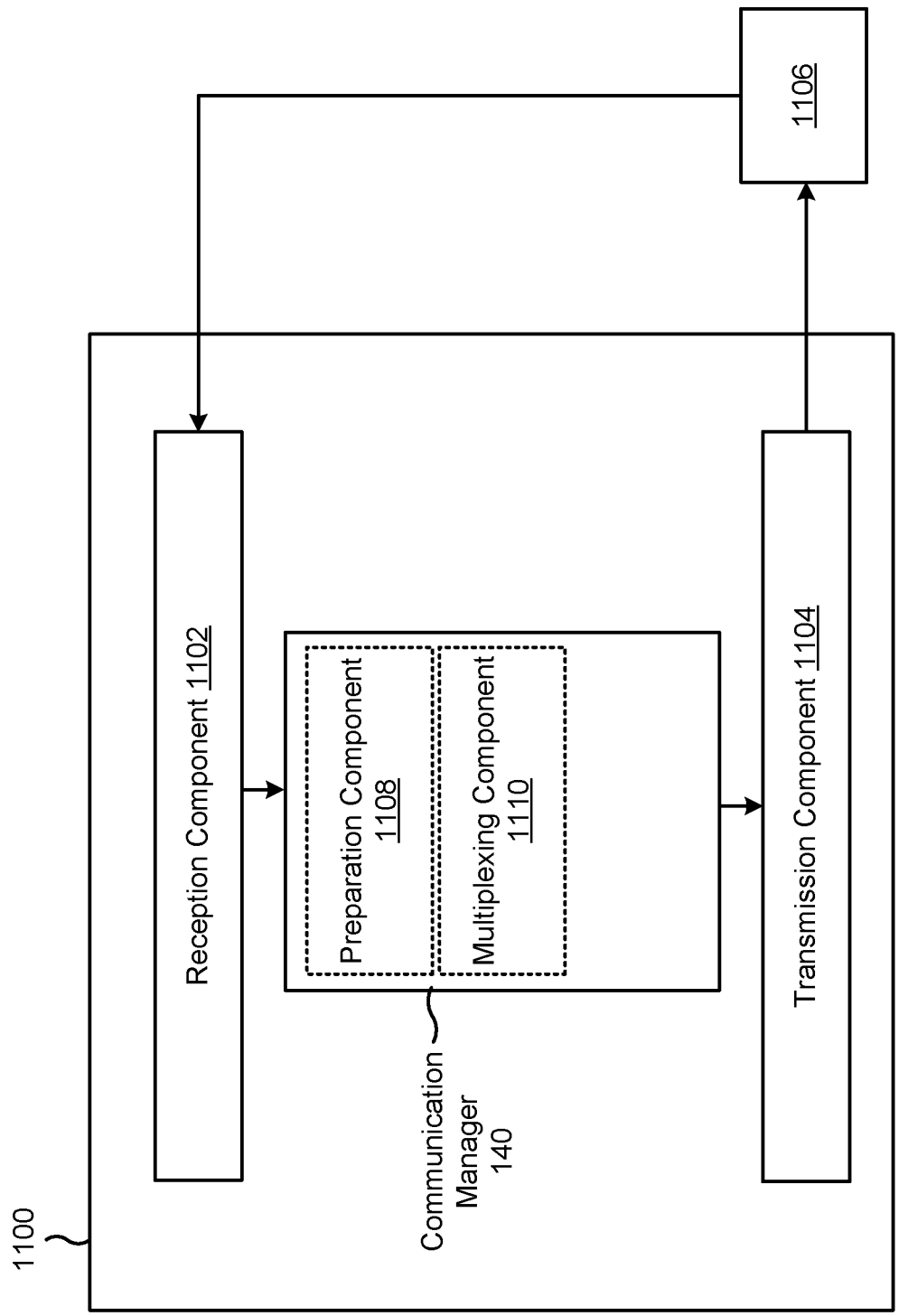

FIG. 11 is a diagram of an example apparatus 1100 for wireless communication. The apparatus 1100 may be a UE (e.g., UE 120), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a network entity, or another wireless communication device) using the reception component 1102 and the transmission component 1104. As further shown, the apparatus 1100 may include the communication manager 140. The communication manager 140 may include a preparation component 1108 and/or a multiplexing component 1110, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The preparation component 1108 may prepare to receive multiple DCI messages, which schedule uplink messages to be transmitted on physical uplink channel resources, at least a specified time duration earlier than a start of an earliest of the physical uplink channel resources. The physical uplink channel resources may be on one or more of an HP PUCCH or an HP PUSCH. The physical uplink channel resources may overlap with an LP physical uplink channel resource. The reception component 1102 may receive the multiple DCI messages at least the specified time duration earlier than a start of the earliest of the physical uplink channel resources.

The multiplexing component 1110 may multiplex at least one of the uplink messages scheduled by the multiple DCI messages into one or more intermediate physical uplink channel resources, where the preparing to receive the multiple DCI messages includes preparing to receive the multiple DCI messages at least the specified time duration earlier than the start of an earliest of the one or more intermediate physical uplink channel resources.

The preparation component 1108 may ignore high priority DCI messages that are received after a DCI message that schedules the last physical uplink channel resource used by the UE for multiplexed uplink.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
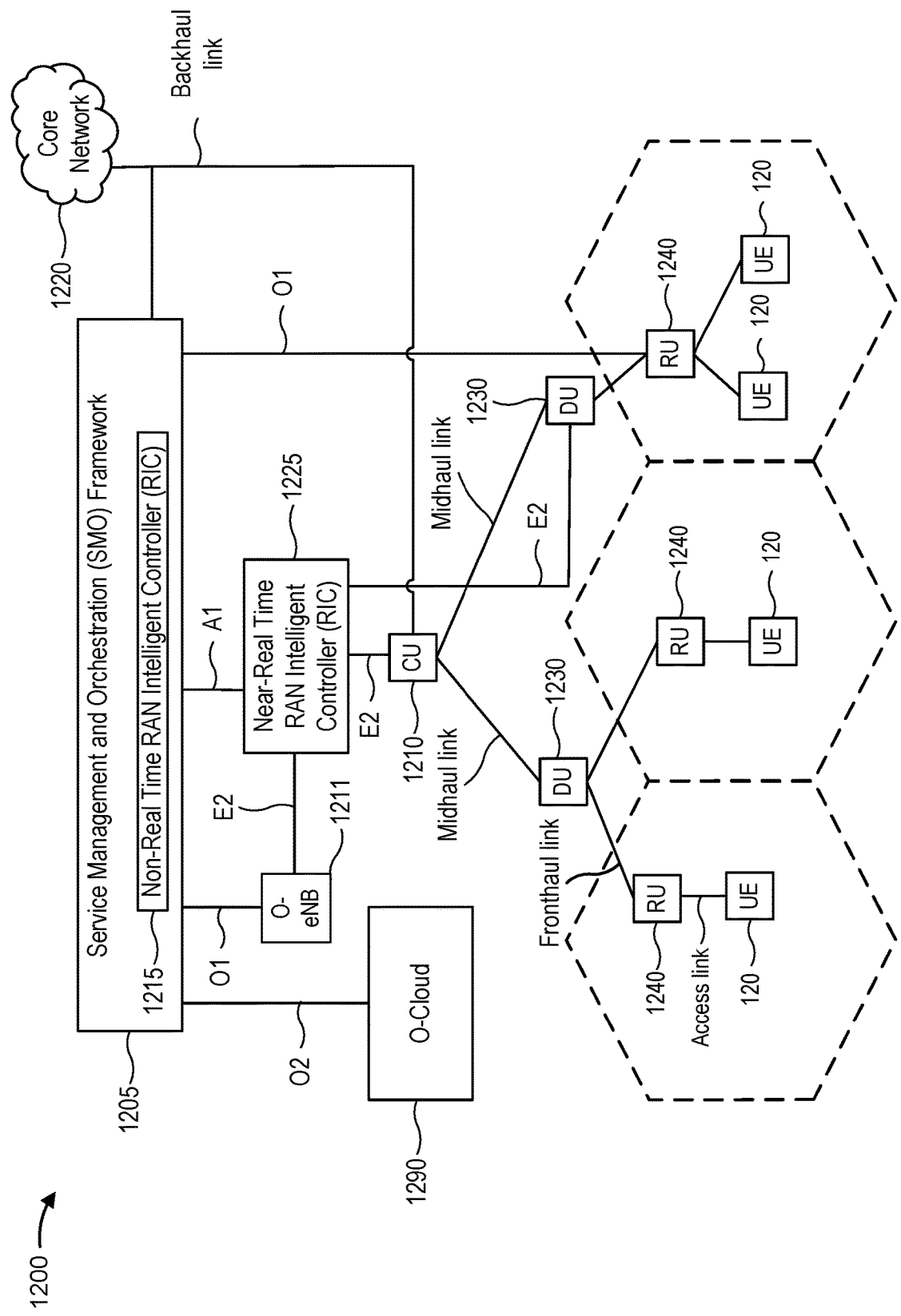
FIG. 12 is a diagram illustrating an example of a disaggregated base station, in accordance with the present disclosure.

FIG. 12 is a diagram illustrating an example of a disaggregated base station 1200, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 1200 architecture may include one or more CUs 1210 that can communicate directly with a core network 1220 via a backhaul link, or indirectly with the core network 1220 through one or more disaggregated base station units (such as a Near-RT RIC 1225 via an E2 link, or a Non-RT RIC 1215 associated with a Service Management and Orchestration (SMO) Framework 1205, or both). A CU 1210 may communicate with one or more DUs 1230 via respective midhaul links, such as an F1 interface. The DUs 1230 may communicate with one or more RUs 1240 via respective fronthaul links. The fronthaul link, the midhaul link, and the backhaul link may be generally referred to as "communication links" The RUs 1240 may communicate with respective UEs 120 via one or more RF access links. In some aspects, the UE 120 may be simultaneously served by multiple RUs 1240. The DUs 1230 and the RUs 1240 may also be referred to as "O-RAN DUs (O-DUs")" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 1210, the DUs 1230, the RUs 1240, as well as the Near-RT RICs 1225, the Non-RT RICs 1215 and the SMO Framework 1205) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit-User Plane (CU-UP)), control plane functionality (i.e., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via 01) or via creation of RAN management policies (such as A1 policies).

As indicated above, FIG. 12 is provided as an example. Other examples may differ from what is described with regard to FIG. 12.

The following provides an overview of some Aspects of the present disclosure:

Aspect 1: A method of wireless communication performed by a network entity, comprising: scheduling multiple downlink control information (DCI) messages, which schedule multiple uplink messages to be transmitted by a user equipment (UE) on physical uplink channel resources, such that each of the multiple DCI messages arrive at least a specified time duration earlier than a start of an earliest of the physical uplink channel resources, wherein the physical uplink channel resources are on one or more of a high priority physical uplink control channel or a high priority physical uplink shared channel, and wherein one or more of the physical uplink channel resources overlap with a low priority physical uplink channel resource; and transmitting the multiple DCI messages as scheduled.

Aspect 2: The method of Aspect 1, wherein the specified time duration is specified as $T_{proc,2}+dl$, wherein $T_{proc,2}$ is an uplink channel preparation time, and wherein dl is an additional cancelation time.

Aspect 3: The method of Aspect 1 or 2, wherein the scheduling the multiple DCI messages includes further scheduling the multiple DCI messages such that each of the multiple DCI messages arrive at least the specified time duration earlier than a start of an earliest of one or more intermediate physical uplink channel resources used by the UE for multiplexed uplink messages.

Aspect 4: The method of Aspect 3, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

Aspect 5: The method of any of Aspects 1-4, wherein the scheduling the multiple DCI messages includes further scheduling the multiple DCI messages such that each of the multiple DCI messages arrive at least the specified time duration earlier than a start of a last physical uplink channel resource used by the UE for multiplexed uplink messages.

Aspect 6: The method of any of Aspects 1-4, wherein the scheduling the multiple DCI messages includes further scheduling the multiple DCI messages such that each of the multiple DCI messages arrive at least the specified time duration earlier than a start of a most recent physical uplink channel resource used by the UE for multiplexed uplink messages, if the UE ignores high priority DCI messages that are received after a DCI message that schedules the last physical uplink channel resource.

Aspect 7: The method of any of Aspects 1-6, wherein the scheduling the multiple DCI messages includes scheduling the multiple DCI messages such that a first DCI message schedules a first physical uplink channel resource, a second DCI message schedule a second physical uplink channel resource, and the second physical uplink channel resource does not start earlier than the first physical uplink channel resource if an uplink message of the first physical uplink channel resource is moved to the second physical uplink channel resource.

Aspect 8: The method of Aspect 7, wherein the first physical uplink channel resource and the second physical uplink channel resource are on one or more high priority channels, and wherein the method further comprises preparing to receive an uplink message that is not to be canceled on a low priority channel.

Aspect 9: The method of any of Aspects 1-8, further comprising: checking for overlap between a low priority channel and a final high priority channel, wherein the final high priority channel is a result of multiplexing content of multiple uplink channels; and receiving on the low priority channel if one of the multiple uplink channels overlaps with the low priority channel and the low priority channel does not overlap with the final high priority channel.

Aspect 10: A method of wireless communication performed by a user equipment (UE), comprising: preparing to receive multiple downlink control information (DCI) messages, which schedule uplink messages to be transmitted on physical uplink channel resources, at least a specified time duration earlier than a start of an earliest of the physical uplink channel resources, wherein the physical uplink channel resources are on one or more of a high priority physical uplink control channel or a high priority physical uplink shared channel, and wherein one or more of the physical uplink channel resources overlap with a low priority physical uplink channel resource; and receiving the multiple DCI messages at least the specified time duration earlier than a start of the earliest of the physical uplink channel resources.

Aspect 11: The method of Aspect 10, wherein the specified time duration is specified as Tproc, 2+dl, wherein Tproc is an uplink channel preparation time, and wherein dl is an additional cancelation time.

Aspect 12: The method of Aspect 10 or 11, further comprising multiplexing at least one of the uplink messages scheduled by the multiple DCI messages into one or more intermediate physical uplink channel resources, wherein the preparing to receive the multiple DCI messages includes preparing to receive the multiple DCI messages at least the specified time duration earlier than the start of an earliest of the one or more intermediate physical uplink channel resources.

Aspect 13: The method of Aspect 10, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

Aspect 14: The method of any of Aspects 10-13, wherein the preparing to receive the multiple DCI messages includes preparing to receive the multiple DCI messages at least the specified time duration earlier than the start of a most recent physical uplink channel resource used by the UE for multiplexed uplink messages.

Aspect 15: The method of Aspect 14, further comprising ignoring high priority DCI messages that are received after a DCI message that schedules the last physical uplink channel resource used by the UE for multiplexed uplink messages.

Aspect 16: The method of any of Aspects 10-15, wherein the receiving the multiple DCI messages includes receiving a first DCI message that schedules a first physical uplink channel resource and a second DCI message that schedules a second physical uplink channel resource, and wherein the second physical uplink channel resource does not start earlier than the first physical uplink channel resource if an uplink message of the first physical uplink channel resource is moved to the second physical uplink channel resource.

Aspect 17: The method of Aspect 16, wherein the first physical uplink channel resource and the second physical uplink channel resource are on one or more high priority channels, and wherein the method further comprises transmitting an uplink message that is not to be canceled on a low priority channel.

Aspect 18: The method of any of Aspects 10-17, further comprising: checking for overlap between a low priority channel and a final high priority channel, wherein the final high priority channel is a result of multiplexing content of multiple uplink channels; and canceling the low priority channel if the low priority channel and the final high priority channel overlap.

Aspect 19: The method of any of Aspects 10-18, further comprising: checking for overlap between a low priority channel and a final high priority channel, wherein the final high priority channel is a result of multiplexing content of multiple uplink channels; and transmitting on the low priority channel if one of the multiple uplink channels overlaps with the low priority channel and the low priority channel does not overlap with the final high priority channel.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising memory, and one or more processors coupled to the memory, the memory comprising instructions executable by the one or more processors to cause the device to perform the method of one or more of Aspects 1-19.

Aspect 22: A device for wireless communication, comprising a memory and one or more processors coupled to the memory, the one or more processors configured to perform the method of one or more of Aspects 1-19.

Aspect 23: An apparatus for wireless communication, comprising at least one means for performing the method of one or more of Aspects 1-19.

Aspect 24: A non-transitory computer-readable medium storing code for wireless communication, the code comprising instructions executable by a processor to perform the method of one or more of Aspects 1-19.

Aspect 25: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network entity, comprising:
   scheduling multiple downlink control information (DCI) messages, which schedule multiple uplink messages to be transmitted by a user equipment (UE) on physical uplink channel resources, such that each of the multiple DCI messages arrives at least a specified time duration earlier than a start of an earliest of the physical uplink channel resources,
      wherein the specified time duration comprises an uplink channel preparation time and an additional cancelation time,
      wherein the physical uplink channel resources are on one or more of a high priority physical uplink control channel or a high priority physical uplink shared channel, and
      wherein one or more of the physical uplink channel resources overlap with a low priority physical uplink channel resource; and
   transmitting the multiple DCI messages as scheduled.

2. The method of claim 1, wherein the scheduling the multiple DCI messages includes scheduling the multiple DCI messages such that each of the multiple DCI messages arrives at least the specified time duration earlier than a start of an earliest of one or more intermediate physical uplink channel resources used by the UE for multiplexed uplink messages.

3. The method of claim 2, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

4. The method of claim 1, wherein the scheduling the multiple DCI messages includes scheduling the multiple DCI messages such that each of the multiple DCI messages arrives at least the specified time duration earlier than a start of a last physical uplink channel resource used by the UE for multiplexed uplink messages.

5. The method of claim 1, wherein the scheduling the multiple DCI messages includes scheduling the multiple DCI messages such that each of the multiple DCI messages arrives at least the specified time duration earlier than a start of a most recent physical uplink channel resource used by the UE for multiplexed uplink control information (UCI), if the UE ignores high priority DCI messages that are received after a DCI message that schedules a last physical uplink channel resource.

6. The method of claim 1, wherein the scheduling the multiple DCI messages includes scheduling the multiple DCI messages such that a first DCI message schedules a first physical uplink channel resource, a second DCI message schedules a second physical uplink channel resource, and the second physical uplink channel resource does not start earlier than the first physical uplink channel resource if an uplink control information (UCI) message of the first physical uplink channel resource is moved to the second physical uplink channel resource.

7. The method of claim 6, wherein the first physical uplink channel resource and the second physical uplink channel resource are on one or more high priority channels, and wherein the method further comprises preparing to receive UCI that is not to be canceled on a low priority channel.

8. The method of claim 1, further comprising:
   checking for overlap between a low priority channel and a final high priority channel, wherein the final high priority channel is a result of multiplexing content of multiple uplink channels; and
   receiving on the low priority channel if one of the multiple uplink channels overlaps with the low priority channel and the low priority channel does not overlap with the final high priority channel.

9. A method of wireless communication performed by a user equipment (UE), comprising:
   preparing to receive multiple downlink control information (DCI) messages, which schedule uplink messages to be transmitted on physical uplink channel resources, at least a specified time duration earlier than a start of an earliest of the physical uplink channel resources,
      wherein the specified time duration comprises an uplink channel preparation time and an additional cancelation time,
      wherein the physical uplink channel resources are on one or more of a high priority physical uplink control channel or a high priority physical uplink shared channel, and
      wherein one or more of the physical uplink channel resources overlap with a low priority physical uplink channel resource; and
   receiving the multiple DCI messages at least the specified time duration earlier than the start of the earliest of the physical uplink channel resources.

10. The method of claim 9, further comprising:
    multiplexing at least one of the uplink messages scheduled by the multiple DCI messages into one or more intermediate physical uplink channel resources,
    wherein the preparing to receive the multiple DCI messages includes preparing to receive the multiple DCI messages at least the specified time duration earlier than a start of an earliest of the one or more intermediate physical uplink channel resources.

11. The method of claim 10, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

12. The method of claim 9, wherein the preparing to receive the multiple DCI messages includes preparing to receive the multiple DCI messages at least the specified time duration earlier than a start of a most recent physical uplink channel resource used by the UE for multiplexed uplink messages.

13. The method of claim 12, further comprising ignoring high priority DCI messages that are received after a DCI message that schedules a last physical uplink channel resource used by the UE for multiplexed uplink messages.

14. The method of claim 9, wherein the receiving the multiple DCI messages includes receiving a first DCI message that schedules a first physical uplink channel resource and a second DCI message that schedules a second physical uplink channel resource, and wherein the second physical uplink channel resource does not start earlier than the first physical uplink channel resource if an uplink message of the first physical uplink channel resource is moved to the second physical uplink channel resource.

15. The method of claim 14, wherein the first physical uplink channel resource and the second physical uplink channel resource are on one or more high priority channels, and wherein the method further comprises transmitting an uplink message that is not to be canceled on a low priority channel.

16. The method of claim 9, further comprising:
checking for overlap between a low priority channel and a final high priority channel, wherein the final high priority channel is a result of multiplexing content of multiple uplink channels; and
canceling the low priority channel if the low priority channel and the final high priority channel overlap.

17. The method of claim 9, further comprising:
checking for overlap between a low priority channel and a final high priority channel, wherein the final high priority channel is a result of multiplexing content of multiple uplink channels; and
transmitting on the low priority channel if one of the multiple uplink channels overlaps with the low priority channel and the low priority channel does not overlap with the final high priority channel.

18. A network entity for wireless communication, comprising:
memory; and
one or more processors coupled to the memory, the memory comprising instructions executable by the one or more processors to cause the network entity to:
schedule multiple downlink control information (DCI) messages, which schedule multiple uplink messages to be transmitted by a user equipment (UE) on physical uplink channel resources, such that each of the multiple DCI messages arrives at least a specified time duration earlier than a start of an earliest of the physical uplink channel resources,
wherein the specified time duration comprises an uplink channel preparation time and an additional cancelation time,
wherein the physical uplink channel resources are on one or more of a high priority physical uplink control channel or a high priority physical uplink shared channel, and
wherein one or more of the physical uplink channel resources overlap with a low priority physical uplink channel resource; and
transmit the multiple DCI messages as scheduled.

19. The network entity of claim 18, wherein the instructions, executable to cause the network entity to schedule the multiple DCI messages, are executable to cause the network entity to schedule the multiple DCI messages such that each of the multiple DCI messages arrives at least the specified time duration earlier than a start of an earliest of one or more intermediate physical uplink channel resources used by the UE for multiplexed uplink messages.

20. The network entity of claim 19, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

21. The network entity of claim 18, wherein the instructions, executable to cause the network entity to schedule the multiple DCI messages, are executable to cause the network entity to schedule the multiple DCI messages such that each of the multiple DCI messages arrives at least the specified time duration earlier than a start of a last physical uplink channel resource used by the UE for multiplexed uplink messages.

22. The network entity of claim 18, wherein the instructions, executable to cause the network entity to schedule the multiple DCI messages, are executable to cause the network entity to schedule the multiple DCI messages such that each of the multiple DCI messages arrives at least the specified time duration earlier than a start of a most recent physical uplink channel resource used by the UE for multiplexed uplink control information (UCI).

23. The network entity of claim 18, wherein the instructions, executable to cause the network entity to schedule the multiple DCI messages such that a first DCI message schedules a first physical uplink channel resource, a second DCI message schedules a second physical uplink channel resource, and the second physical uplink channel resource does not start earlier than the first physical uplink channel resource.

24. The network entity of claim 23, wherein the second physical uplink channel resource does not start earlier than the first physical uplink channel resource based at least in part on an uplink control information (UCI) message of the first physical uplink channel resource being moved to the second physical uplink channel resource.

25. A user equipment (UE) for wireless communication, comprising:
memory; and
one or more processors coupled to the memory, the memory comprising instructions executable by the one or more processors to cause the UE to:
prepare to receive multiple downlink control information (DCI) messages, which schedule uplink messages to be transmitted on physical uplink channel resources, at least a specified time duration earlier than a start of an earliest of the physical uplink channel resources,
wherein the specified time duration comprises an uplink channel preparation time and an additional cancelation time, wherein the physical uplink channel resources are on one or more of a high priority physical uplink control channel or a high priority physical uplink shared channel, and wherein one or more of the physical uplink channel resources overlap with a low priority physical uplink channel resource; and receive the multiple DCI messages at least the specified time duration earlier than a start of the earliest of the physical uplink channel resources.

26. The UE of claim 25, wherein the memory further comprises instructions executable by the one or more processors to cause the UE to:

multiplex at least one of the uplink messages scheduled by the multiple DCI messages into one or more intermediate physical uplink channel resources; and wherein the instructions, executable to cause the UE to prepare to receive the multiple DCI messages, are executable to cause the UE to:

prepare to receive the multiple DCI messages at least the specified time duration earlier than a start of an earliest of the one or more intermediate physical uplink channel resources.

27. The UE of claim 26, wherein a first physical uplink channel resource of the physical uplink channel resources starts earlier than the one or more intermediate physical uplink channel resources, and a second physical uplink channel resource of the physical uplink channel resources starts later than the one or more intermediate physical uplink channel resources.

28. The UE of claim 25, wherein the instructions, executable to cause the UE to prepare to receive the multiple DCI messages, are executable to cause the UE to prepare to receive the multiple DCI messages at least the specified time duration earlier than a start of a most recent physical uplink channel resource used by the UE for multiplexed uplink messages.

29. The UE of claim 25, wherein the memory further comprises instructions executable by the one or more processors to cause the UE to:

check for overlap between a low priority channel and a final high priority channel, wherein the final high priority channel is a result of multiplexing content of multiple uplink channels; and cancel the low priority channel if the low priority channel and the final high priority channel overlap.

30. The UE of claim 25, wherein the memory further comprises instructions executable by the one or more processors to cause the UE to:

check for overlap between a low priority channel and a final high priority channel, wherein the final high priority channel is a result of multiplexing content of multiple uplink channels; and transmit on the low priority channel if one of the multiple uplink channels overlaps with the low priority channel and the low priority channel does not overlap with the final high priority channel.

* * * * *